United States Patent [19]

Terada et al.

[11] Patent Number: 5,581,799
[45] Date of Patent: Dec. 3, 1996

[54] BRAZEABLE ALUMINUM MATERIAL AND A METHOD OF PRODUCING SAME

[75] Inventors: Takashi Terada, Shimotsugagun; Masahiro Kojima, Oyamashi; Taizo Morita, Oyamashi; Katsuyuki Arakawa, Oyamashi; Ichiro Iwai, Oyamashi; Masakazu Furuta, Oyamashi, all of Japan

[73] Assignee: Showa Aluminum Corporation, Osaka, Japan

[21] Appl. No.: 441,388

[22] Filed: May 15, 1995

Related U.S. Application Data

[62] Division of Ser. No. 144,136, Oct. 27, 1993.

[30] Foreign Application Priority Data

Oct. 30, 1992 [JP] Japan .................. 4-333413

[51] Int. Cl.⁶ .................................. B22F 7/04
[52] U.S. Cl. .................. 428/553; 428/546; 428/548; 428/559; 428/557
[58] Field of Search .................. 228/183, 194; 428/553, 554, 546, 557, 548; 49/5, 23, 30, 46, 61

[56] References Cited

U.S. PATENT DOCUMENTS

| 4,905,886 | 3/1990 | Kennedy et al. | 228/194 |
| 5,251,374 | 10/1993 | Halstead | 29/890.047 |
| 5,330,090 | 7/1994 | Iwai et al. | 228/56.3 |

*Primary Examiner*—Charles T. Jordan
*Assistant Examiner*—John N. Greaves

[57] ABSTRACT

A brazeable aluminum material is composed of an aluminum core and a brazing agent layer consisting of a brazing agent thermally sprayed onto and covering a surface of the core. A number of unmolten minute particles of the brazing agent are present in the brazing agent layer, which contains at least an aluminum-silicon alloy and/or a mixture of aluminum and silicon. Characteristic features of a method of producing the brazeable aluminum material are the steps of: preparing a powder composed of minute particles; and thermally spraying the powder onto the aluminum core in such a state that only a surface of each minute particle is molten, with a pith of the particle remaining unmolten. The powder is an Al-Si alloy and/or a mixture of Al powder and Si powder.

5 Claims, 16 Drawing Sheets

Example No. 2 ×200

Example No. 8  ×200

Example No. 9  ×200

Example No. 10    ×200

Example No. 11    ×200

Example No. 12    ×200

Example No. 13    ×200

Example No. 14    ×200

Reference No. 19    ×200

Reference No. 20    ×200

Example No. 10　×37.5

Example No. 11  ×37.5

Example No. 12 ×37.5

Example No. 13   ×37.5

Example No. 14  ×37.5

BRAZEABLE ALUMINUM MATERIAL AND A METHOD OF PRODUCING SAME

This is a divisional of application Ser. No. 08/144,136, filed Oct. 27, 1993, the text of which is hereby incorporated by reference.

BACKGROUND OF THE INVENTION

The present invention relates to a brazeable aluminum material for use to construct a heat exchanger or any other apparatus or the like which are manufactured by the brazing technique, and also relates to a method of producing the brazeable aluminum material.

The term "aluminum" used herein is meant to include aluminum alloys.

Aluminum is used widely to manufacture various kinds of brazed articles and apparatuses, because it is comparatively light, highly processable and heat conductive.

An easily brazeable aluminum brazing sheet, which has widely been used for that purpose, is composed of an aluminum core sheet having a surface 'roll-clad' with a layer of a brazing agent. For certain kinds of aluminum materials including those which are prepared by the extruding method, the cladding of said agent is impossible or very difficult.

The 'thermal spraying' method is known and has been proposed to form a brazing agent layer on aluminum materials such as the extruded one which can hardly be clad with said layer (see for example the Japanese Patent Publication Sho. 63-1152, and Unexamined Publications Hei. 1-157794, ibid. Sho. 63-119974, ibid. Hei. 1-107961 and ibid. Hei. 2-46969)

However some aluminum materials coated with the thermally sprayed brazing agent are poor in brazeability. The present inventors have investigated those defective cases and found the following facts to be a cause thereof.

Generally, the prior art methods of thermal spraying do use as the brazing agent a wire of brazeable alloy, as disclosed in the Patent Publications Sho. 63-1152 or Hei. 1-157794. The wire of the brazing agent thus has to completely melt to form liquid particles sticking to an aluminum core sheet. A high temperature causing the agent to completely melt will produce on the core sheet a resistant oxide membrane, which renders less brazeable the aluminum material. The sprayed liquid particles solidify on the core sheet to form a continuous layer of the brazing agent. A fine internal texture found in such a layer however resembles that which would appear after the brazing of aluminum material. Thus, this layer can no longer act as any effective brazing agent layer in subsequent use. Further, in the case of the plasma-arc spraying at extremely high temperatures, a considerable amount of the brazing agent is likely to evaporate during or after melt deposition on the aluminum surface. Consequently, an undesirable change in the agent would impair its brazeability.

An object of the present invention is therefore to provide a brazeable aluminum material comprising an aluminum core which is coated with a thermally sprayed brazing agent layer but free from the problem of unsatisfactory brazeability inherent in the prior art thermally sprayed layer.

A further object of the present invention is to provide a method of producing such a brazeable aluminum material as just noted above.

A brazeable aluminum material which achieves the above comprises an aluminum core having its surface coated with a thermally sprayed brazing agent layer which substantially is composed of a number of unmolten granular particles of a brazing agent. In order to achieve the further object, the method provided herein to produce a brazeable aluminum material composed of an aluminum core comprises the steps of preparing a powder of a brazing agent and then thermally spraying the powder onto the aluminum core under a condition such that only surfaces of most of powder granules are molten, with an interior of each granule remaining unmolten.

Other objects, features and advantages of the present invention will become clear from the description made below referring to the drawings.

DETAILED DESCRIPTION OF THE INVENTION

Figure 1:
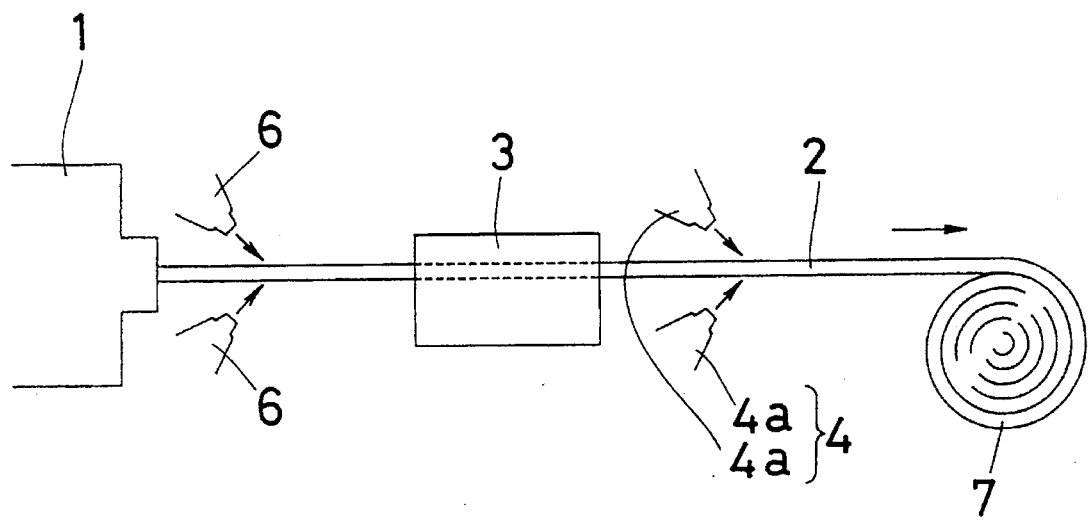
FIG. 1 is a front elevation diagrammatically showing a process in which the thermal spraying of a brazing agent is carried out in unison with the extrusion of an aluminum core.

An aluminum used as a core in the present invention is not restricted to those which are of a specific composition, but may be of any composition depending on its final use. Aluminum may be extruded, rolled, cast or otherwise processed to give articles of any desired configuration or cross-sectional shape, also depending on the final use.

A number of unmolten granular particles of a brazing agent exist in a brazing agent layer which is sprayed onto the aluminum core. Those minute particles maintain their fine metallic texture, which is not affected by the step of thermal spraying, is effective to ensure a satisfactory brazing of the aluminum material.

In order to have such a number of unmolten granular particles in the layer, the invention employs a powder of the agent. This brazing agent powder can easily be controlled to be half-molten when thermally spraying it such that only a surface of each particle melts, with its interior (at least its pith or marrow) however remaining unmolten. Typically, the powder is an Al-Si alloy (i.e., an alloy included in aluminum-silicon alloy series) powder used as the brazing agent. Alternatively, a mixture of Al powder and Si powder may be employed, provided that they produce a substantially uniform and homogeneous brazing agent layer when sprayed onto the core. If Si content in the brazing agent is less than about 5% or higher than about 40% by weight, then the brazing agent will have a so high temperature of liquidus line that it is not easy to braze the aluminum articles. Thus, for a smooth and effective brazing, the Si content in the brazing agent layer must be within a range from about 5% to about 40% by weight, and more desirably from about 8% to about 13% by weight. In view of the change in composition during the thermal spraying, the Si content in Al-Si alloy as the raw material to be sprayed must be from about 5% to about 40% by weight. A more preferable range of Si content is from about 8% to about 25% by weight in the unsprayed Al-Si alloy. In case of using the mixture of Al and Si powders which may not necessarily form an ideal alloy in the sprayed brazing agent layer, a satisfactory brazeability will be obtained at a Si content falling within a range of from about 5% to about 40% by weight. Therefore, Si content in an unsprayed powder mixture is desirably from about 5% to about 50% by weight. Alternatively, a mixture of the Al-Si alloy powder, Al powder and Si powder may be used in place of the alloy powder, or in place of the mixture of Al and Si powders.

For the preferential melting of the surface of powder particles of the described powder(s), ideally or substantially spherical particles are preferred rather than flat ones such as those of an atomized powder. The round particles can advantageously flow smooth through a thin passage of the spray gun. From a practical point of view, at least about 10% or more preferably at least about 50% by weight of the powder(s) must consist of round particles. Since finer particles undesirably tend to completely melt, the particles used herein may be of an average diameter of about 10 μm or greater. However, undesirably large chinks will be formed between adjacent coarser particles of an average diameter greater than about 200 μm, thereby rendering incompact the brazing agent layer. Therefore, an average diameter of about 200 μm or less, thus a range of from about 10 to about 200 μm or more preferably of from about 50 to about 150 μm, is recommendable.

The condition and parameters of the spraying process need not fall in a narrow range, but may be varied insofar as the preferential melting of the surface of each particle is assured. An example of the spraying condition is as follows.

The spraying temperature may be controlled in a range of from about 1000° C. to about 3000° C. A temperature lower than about 1000° C. will probably cause the particle surface not to melt to a sufficient extent and not to stick to the aluminum core. On the other hand, an excessively high temperature above about 3000° C. will completely melt not only the surface but also pith of each particle. Thus, the most preferable spraying temperature is from about 2300° to about 2900° C., which may be realized for example in the flame spraying technique.

A distance between a nozzle of the spray gun and the aluminum core sheet is preferably from about 50 to about 500 mm. The distance shorter than about 50 mm will cause the powder(s) to excessively melt, oxidizing the produced brazing agent layer and also bringing about thermal deformation and/or an undesirable change in fine internal texture of the aluminum core. On the other hand a longer distance beyond about 500 mm will allow the partially molten particles to solidify well before reaching the aluminum core, thus reducing deposit amount of the powder and impairing brazeability. A preferred range is from about 150 to about 300 mm. Feed rate of the powder to be molten is desirably from about 30 to about 180 grams/minute ("g/min"), because the shortage of powder(s) fed at a rate lower than about 30 g/min will result in a poor brazeability of the formed layer. A higher rate above about 180 g/min produces an excessively thick brazing agent layer, not only uneconomical but also shrinking to exfoliate from the core when cooling on the aluminum core. A desirable powder feed rate is thus from about 90 to about 150 g/min.

It is recommendable to carry out the thermal spraying within non-oxidizing atmosphere such a $N_2$ gas in order to avoid oxidation of aluminum surface and powder particles, because such oxidation during the spraying would adversely affect the brazing agent layer and its brazeability. In order to avoid oxidation of the surface and powder particles after the spraying, oxygen content in the powder(s) need be not more than about 0.05% by weight.

Figure 2:
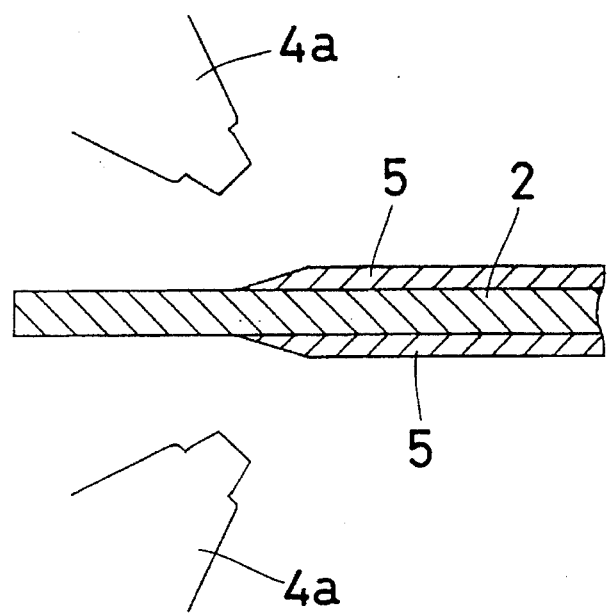
FIG. 2 is a cross section illustrating in part and on an enlarged scale the process shown in FIG. 1.

The described thermal spraying of the brazing agent powder may be done after having molded or otherwise formed the aluminum articles. It is however more desirable to conduct the spraying continuously and simultaneously with the extrusion thereof to save labor and improve production efficiency. In an example of the latter case, the powder is thermally sprayed at a location close to an extruder 1 onto an article 2 immediately after extrusion thereof from the extruder. In another and more preferable example, a set of spray guns 4 are disposed downstream of a cooling bath or tunnel 3 so as to apply the powder to the article which has been water-cooled or otherwise cooled to a room temperature. The cooled article cools the sprayed powder to or near a room temperature, thus protects it from being further molten and oxidized. If the powder is sprayed before the article is cooled, then water will be absorbed in the sprayed porous layer of the brazing agent to thereby adversely affect the brazeability of said article. The layer 5 may be of a mono-stratum (as shown in FIG. 2) or a multi-stratum structure. In any case, thickness of the sprayed brazing agent layer 5 has to be 8 μm or more for a good brazeability. Either side of the extruded article 2 may solely be provided with such a layer 5, or as shown in FIG. 1, both of upper and lower sides may be so done with an upper and lower guns 4a, respectively.

With respect to corrosion resistance of the aluminum article, the brazing agent layer formed thereon is insufficient to better it. Therefore, a Zn ("zinc") undercoat may be thermally sprayed or otherwise formed prior to spraying of the brazing agent powder. In a case wherein zinc is applied to the Just extruded article, another set of guns 6 are equipped in line near the extruder 1. Zinc atoms thus blown onto the hot and active surface of said article 2 will migrate and spread evenly and smoothly.

An Al-Si-Zn alloy powder may be used to dispense with such a separate spraying of Zn, and Zn atoms will also migrate in the article to render it more resistant to corrosion.

When spraying particles in the method proposed herein, all the particles may not necessarily be molten selectively at surface, but some of them may be molten to the core, or may remain unmolten and entirely solid.

It will now be apparent that the brazeable aluminum article and the method of making same provided herein are characterized by the brazing agent layer which is formed of a powder, or of a mixture of powders having surfaces preferentially molten and then solidified. Extremely high temperatures are no longer necessitated to melt the particles to the core, thus suppressing oxidation thereof which would result in a poor brazeability. The piths or cores of almost all the particles are left fresh and solid during the spraying process, whereby internal fine structure of the layer is not in its state as if it had already been used to braze the aluminum article. Such an unmolten internal texture thus affords an excellent brazing of the aluminum article. There is no likelihood that any fraction of the agent evaporates to such an extent as spoiling a high quality of the brazed aluminum products.

It will also be understood that the temporarily molten surfaces of sprayed powder particles enable them to stick to aluminum material so as not to exfoliate therefrom.

DESCRIPTION OF THE PREFERRED EMBODIMENTS

Figure 3:
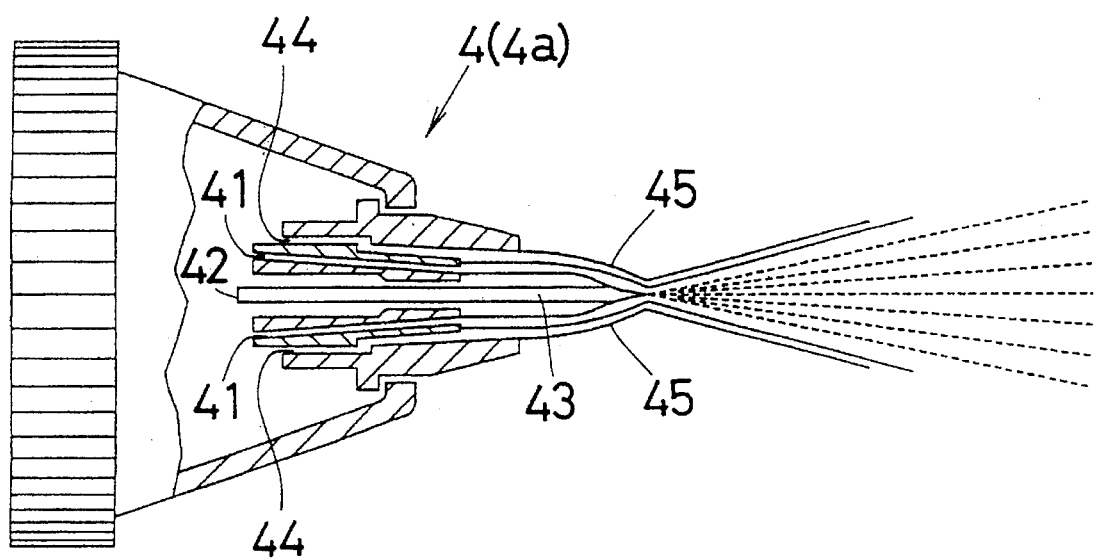
FIG. 3 is an enlarged cross section of a spraying gun used in an embodiment.

An aluminum alloy included in the JIS-1070 series was used to extrude a perforated and flat tube which was 16 mm wide and 3 mm high. The alloy coming out of an extruder 1 was cooled in a cooling water bath 3, before continuously taken up to form a coil 7. An upper and lower spray guns 4a and 4a were respectively disposed above and below the extruded tube 2 and arranged downstream of the water bath 3, being slanted towards the coil 7. Each spray gun had a nozzle of the flame type as schemed in FIG. 3. A fuel pipe 41 supplied the nozzle with a mixed gas of fuel and oxygen so that the gas ejected from the nozzle was fired to continuously form a flame of columnar shape. A brazing agent powder 43 carried by a carrier gas was supplied through a powder feed pipe 42 into the flame so as to be heated therein. A compressed air from an air pipe 44 was blown through the nozzle into said frame. A mist jet thus produced to suspend therein the heated powder was blown forwards to stick to the surface of extruded aluminum article 2. The reference numeral 45 in FIG. 3 denotes an air stream. Each of those spray guns were operated at: $O_2$ feed rate of 700 liters/min; propylene feed rate of 68 liters/min; and a compressed air rate of 800 liters/min. The flame temperature (that is, thermal spraying temperature) was about 2700° C.

The types of thermally sprayed powders, as well as Si content therein and the spraying condition were varied as listed in Table 1. Piths of particles in the thermally sprayed powders remained unmolten, with only a surface of each particle melted while being applied to form a brazing agent layer on both surfaces of extruded article 2. To the Example Nos. 3, 4, 7 and 9, zinc was thermally sprayed at first using zinc sprayers 6 disposed close to and downstream of the extruder 1 in FIG. 1, prior to the thermal spraying of the brazing agent powder.

Average thickness of the obtained brazing agent layers were measured and Si content therein were analyzed to give a result shown in Table 1.

Figure 4:
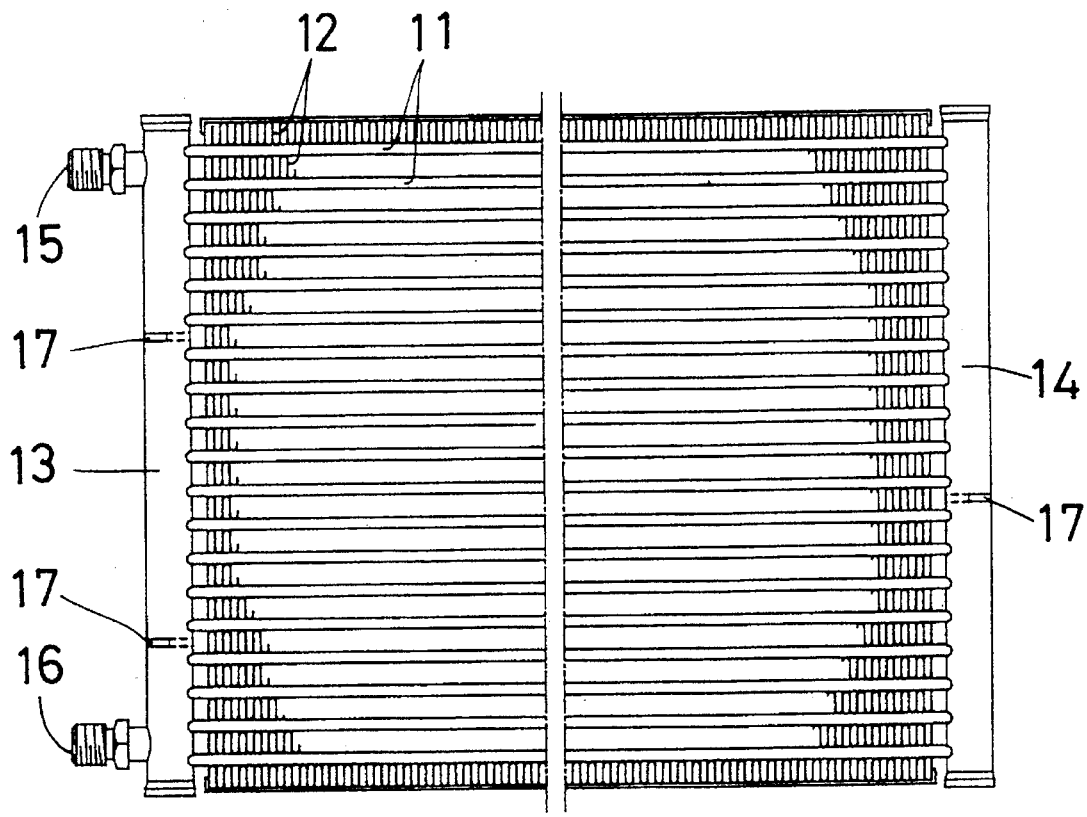
FIG. 4 is a front elevation of a multi-flow type heat exchanger made of a brazeable aluminum material produced in accordance with the embodiment.
Figure 5:
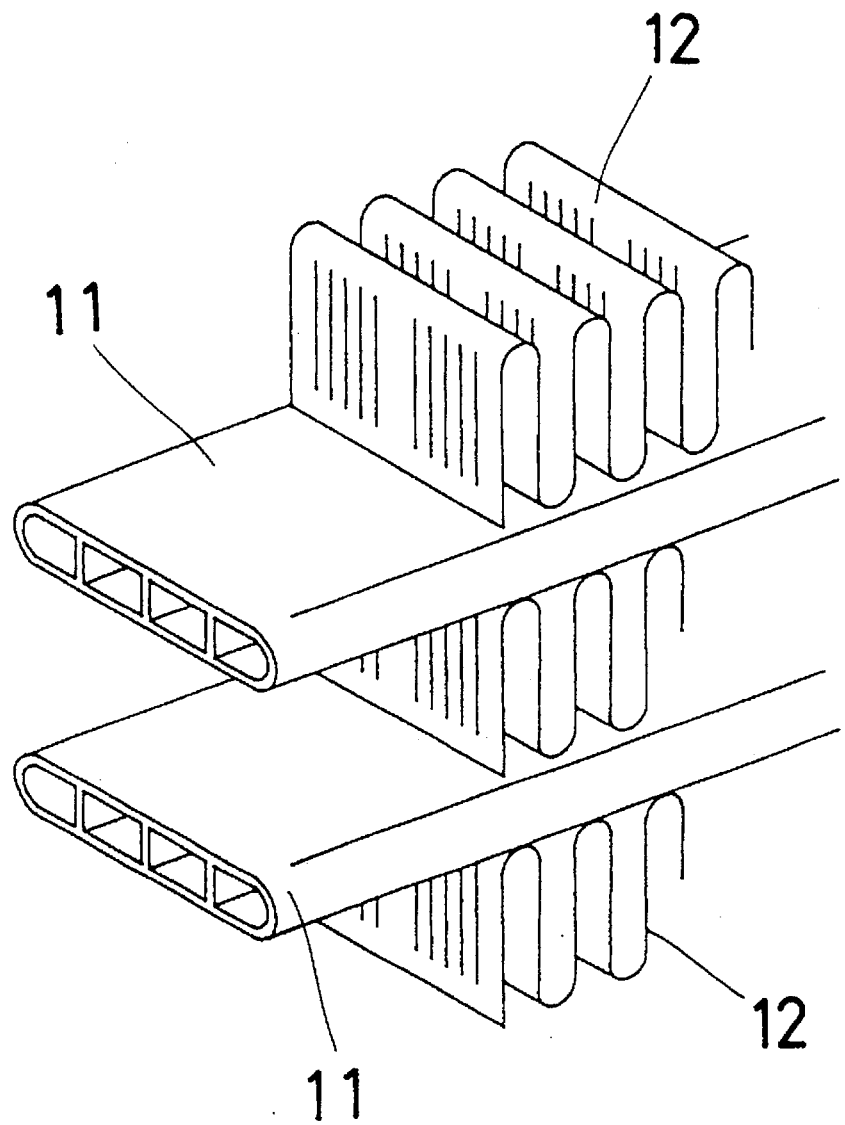
FIG. 5 is a perspective view of the heat exchanger as shown in FIG. 4, with its tubes and corrugated fins being separated from other members of the heat exchanger.

The thus prepared brazeable aluminum materials were used to fabricate heat-exchanging tubes, which were then assembled to give an aluminum heat exchanger of the multi-flow type as shown in FIGS. 4 and 5. This heat exchanger comprises a plurality of the tubes 11 arranged horizontal in parallel with each other, in combination with a plurality of corrugated fins 12 each interposed between the two adjacent tubes. Both ends of each tube are connected to left- and right-hand hollow cylindrical headers 13 and 14 in fluid communication therewith. A coolant inlet pipe 15 and outlet pipe 16 are adjoined to a periphery of the left-hand header 13, at its upper and lower ends, respectively. Partitions 17 secured in the headers provide a meandering path for the coolant flowing through the heat exchanger. Those corrugated fins 12 are made of an aluminum alloy included in the JIS-1050 series.

A flux emulsion was applied to the assembled heat changer and then dried before heated in $N_2$ at 580° C. for 5 minutes. Due to this heating, the tubes 11 were rigidly adjoined to the corrugated fins 12 and to the headers 13 and 14, with other relevant members also being brazed one to another. The brazing agent layer covering the tubes 11 served to adjoin them to the fins 12, while thin brazing agent sheets clad on outer and inner periphery of the headers 13 and 14 contributed to adjoin them to the tubes 11.

Brazeability of each Example was evaluated by measuring a "bonded ratio" for the heat exchangers as to their tubes 11 to which the corrugated fins 12 had been adjoined. The "bonded ratio" is a ratio of the number of the fin's ridges which remain adjoined to the tube after forcibly removing portions thereof other than the ridges, to the total of ridges initially included in one fin. The number of partially remaining ridges was divided by 4 (four) to be added to the number of ridges remaining perfectly bonded.

Reference Nos. 18–20 (in Table 1) were prepared by the plasma-arc spraying conducted at a temperature of about 10000° C. All the particles in the brazing agent powder in each Reference were molten to the core when sprayed to raw tubes to give brazeable tubes. Another Reference No. 21 was prepared using a brazing alloy wire having a diameter of 2.4 mm φ, by the electric-arc welding method also at about 10000° C. The molten alloy was sprayed onto the raw tube to give another brazeable tube. Those tubes were incorporated in heat exchangers and subsequently subjected to the brazing process under the same condition as the Examples.

Data which were obtained in the described manner are given in Table 1.

TABLE 1

| | Powder to be sprayed | | | | Condition of spraying | | Av. thick. of b.a. layer (μm) | Si in b.a. layer (wt. %) | Brazeability | |
|---|---|---|---|---|---|---|---|---|---|---|
| | Type (A/B*) | Av. dia. (μm) | Ratio of sphr. (%) | O₂ cont. (wt. %) | Distance (mm) *1 | Feed rate (gr/min) *2 | | | (Bond. rat. of fins) (%) | Temp. of spray. (°C.) |
| Examples | | | | | | | | | | |
| 1 | A | 70 | 80 | 0.02 | 100 | 90 | 30 | 12.5 | 94 | ca. 2700 |
| 2 | A | 100 | 80 | 0.02 | 125 | 90 | 30 | 11.5 | 95 | ca. 2700 |
| 3 | A | 100 | 80 | 0.02 | 150 | 90 | 30 | 11.4 | 98 | ca. 2700 |
| 4 | A | 120 | 100 | 0.02 | 200 | 90 | 30 | 11.9 | 98 | ca. 2700 |
| 5 | A | 100 | 30 | 0.02 | 125 | 90 | 30 | 12.0 | 90 | ca. 2700 |
| 6 | A | 100 | 70 | 0.02 | 100 | 120 | 50 | 12.3 | 93 | ca. 2700 |
| 7 | A | 100 | 70 | 0.02 | 150 | 120 | 50 | 12.4 | 98 | ca. 2700 |
| 8 | A | 110 | 40 | 0.02 | 200 | 90 | 30 | 11.8 | 93 | ca. 2700 |
| 9 | A | 110 | 90 | 0.02 | 200 | 120 | 50 | 12.4 | 99 | ca. 2700 |
| 10 | A | 80 | 90 | 0.02 | 100 | 60 | 10 | 12.8 | 90 | ca. 2700 |
| 11 | A | 100 | 80 | 0.02 | 125 | 60 | 10 | 12.7 | 93 | ca. 2700 |
| 12 | A | 100 | 80 | 0.02 | 150 | 60 | 10 | 12.8 | 95 | ca. 2700 |
| 13 | B* | 44 | 100 | — | 100 | 60 | 10 | 33.3 | 90 | ca. 2700 |
| 14 | B* | 44 | 100 | — | 125 | 60 | 10 | 31.4 | 93 | ca. 2700 |
| 15 | A | 80 | 80 | 0.02 | 250 | 120 | 50 | 8.5 | 98 | ca. 2700 |
| 16 | A | 100 | 80 | 0.02 | 300 | 90 | 30 | 10.2 | 97 | ca. 2700 |
| 17 | A | 100 | 80 | 0.02 | 400 | 90 | 20 | 9.7 | 95 | ca. 2700 |
| References | | | | | | | | | | |
| 18 | A | 100 | 80 | 0.02 | 200 | 60 | 10 | 8.8 | 45 | ca. 10000 |
| 19 | A | 100 | 80 | 0.02 | 200 | 90 | 30 | 11.2 | 55 | ca. 10000 |
| 20 | A | 100 | 80 | 0.02 | 200 | 120 | 50 | 11.1 | 35 | ca. 10000 |
| 21 | wire of 2.4 mm φ | | | | 200 | — | 30 | 12.2 | 70 | ca. 10000 |

Figure 6A:
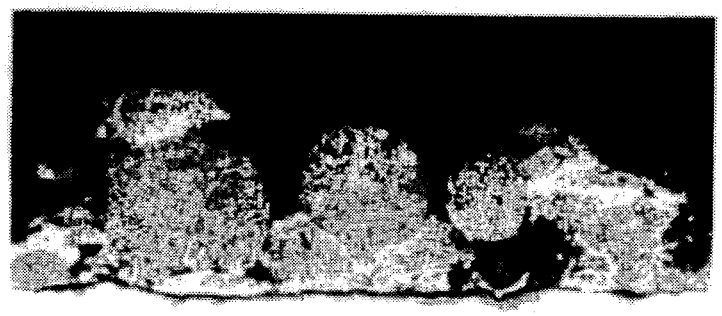
FIGS. 6A and 6B are a photograph and a sketch thereof, respectively, showing the metallic texture of a brazing agent layer obtained as Example No. 2 in the embodiment.
Figure 6B:
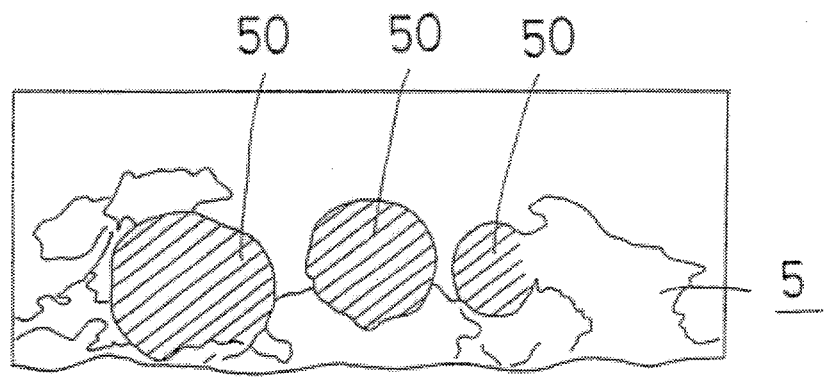

Notes:
A = Al—Si(12 wt. %) alloy, B* = mixture of Al (800 gr) + Si (200 gr) Av. dia. = Average diameter, sphr. = spherical particles, cont. = content, *1 = distance between nozzle and aluminum core, *2 = feed rate of brazing agent powder, b.a. = brazing agent, Bond. rat. = Bonded ratio, Thick. = Thickness Temp. = temperature Example Nos. 2, 8 to 14, Reference Nos. 19 and 20 gave the thermally sprayed brazeable agent layers, whose cross sections were inspected microscopically to give enlarged photographs of metallurgical texture, as seen in FIGS. 6A, 7A, 8A and 9 through 15. FIG. 6B symbolically represents the texture given as FIG. 6A. Further, aluminum alloy plates of JIS-1070 which respectively were covered with the brazing agent layers thermally sprayed with those powders and under the conditions for Example Nos. 10 to 14 of the invention were prepared. The plates were brazed to other aluminum alloy plates of JIS-1050 to form T-joints. FIGS. 16 to 20 are photographs of the metallurgical textures of adjoined portions of these T-joints.

Figure 7A:
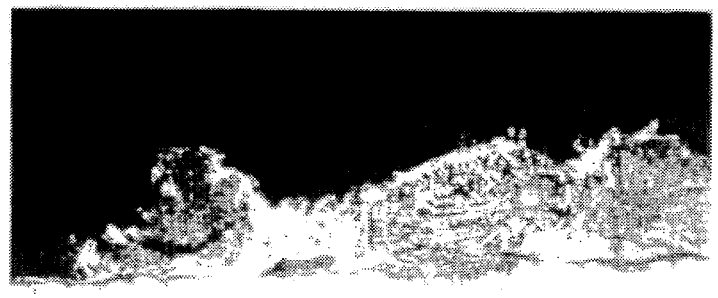
FIGS. 7A and 7B are a photograph and a sketch similarly showing the texture obtained as Example No. 8.
Figure 7B:
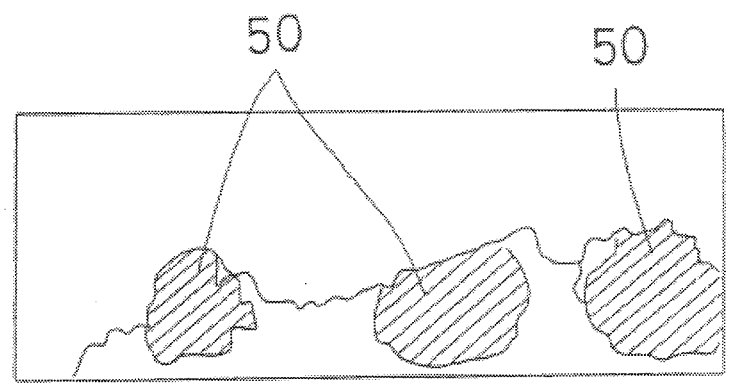
Figure 8A:
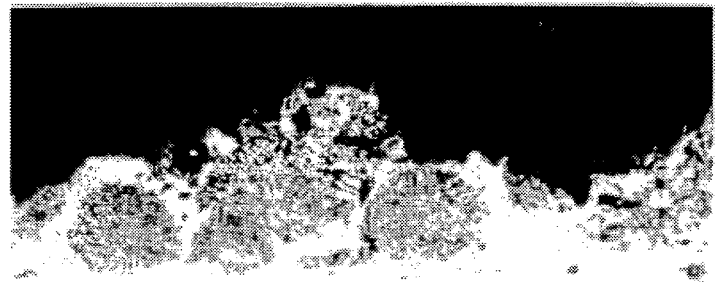
FIGS. 8A and 8B also are a photograph and a sketch similarly showing the texture obtained as Example No. 9.
Figure 8B:
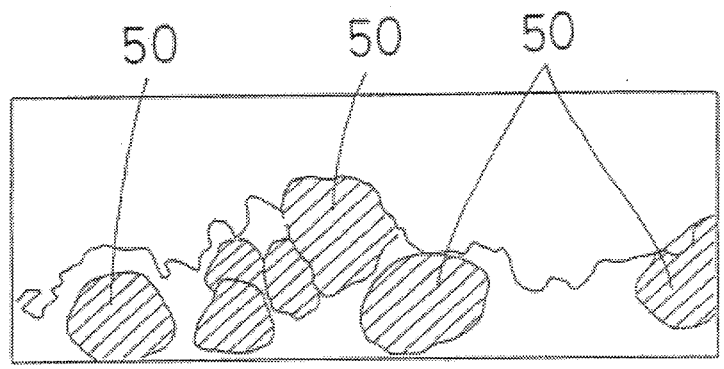
Figure 9:
FIG. 9 is a photograph showing the metallic texture of the brazing agent layer obtained as Example No. 10 in the embodiment.
Figure 10:
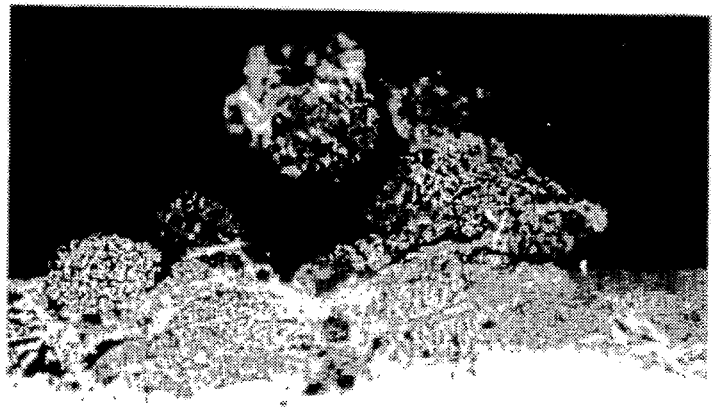
FIG. 10 is a photograph similarly showing the layer obtained as Example No. 11.
Figure 11:
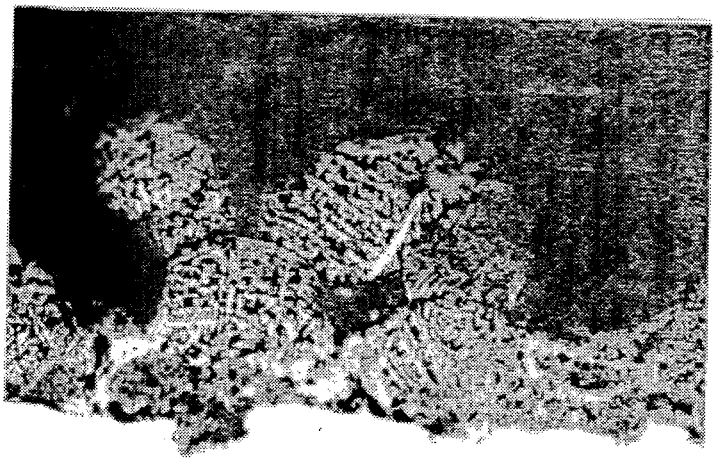
FIG. 11 is a photograph similarly showing the layer obtained as Example No. 12.
Figure 12:
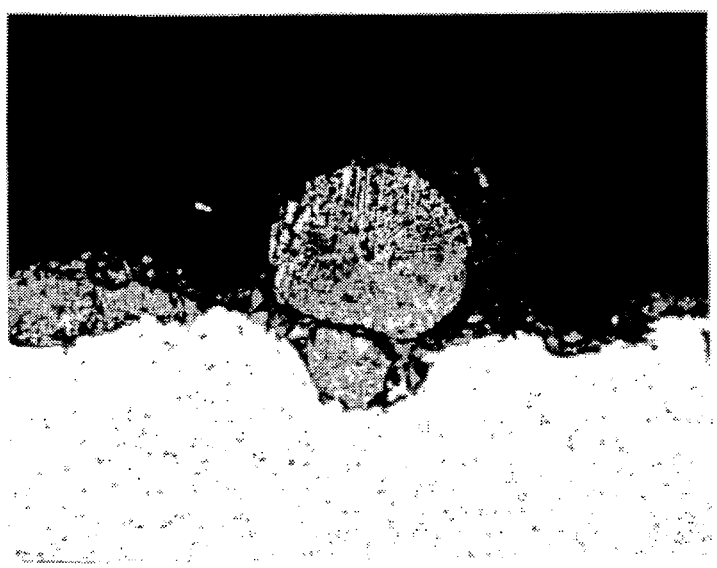
FIG. 12 is a photograph similarly showing the layer obtained as Example No. 13.
Figure 13:
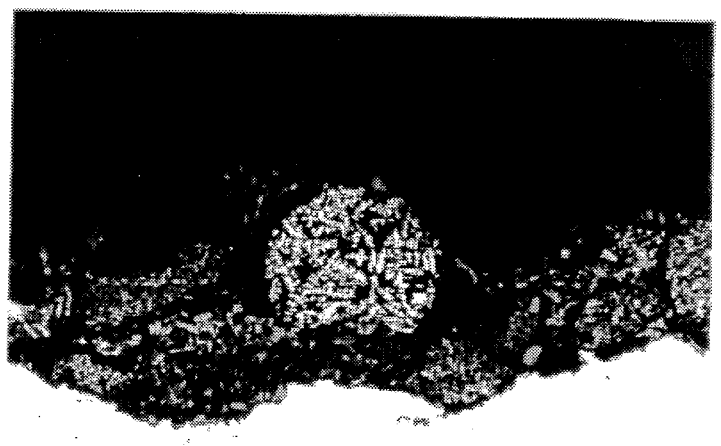
FIG. 13 is a photograph similarly showing the layer obtained as Example No. 14.
Figure 14:
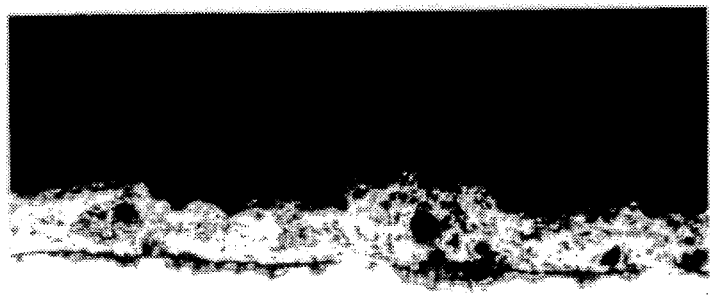
FIG. 14 is a photograph similarly showing the layer obtained as Reference No. 19.
Figure 15:
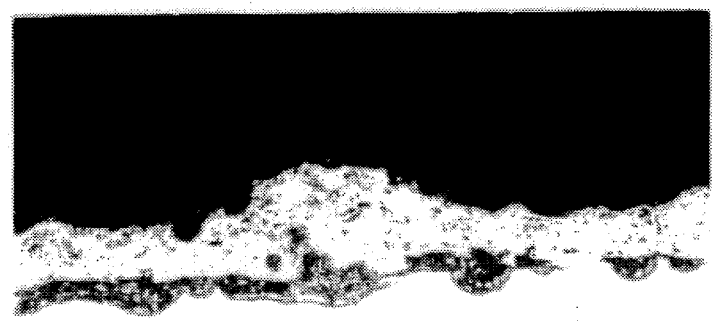
FIG. 15 is a photograph similarly showing the layer obtained as Reference No. 20.
Figure 16:
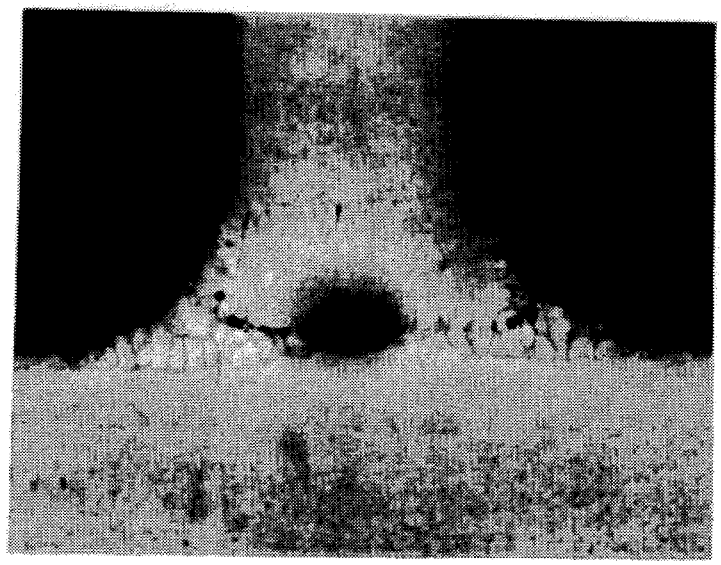
FIG. 16 is a photograph showing the metallic texture observed in a brazed portion of the layer produced under the same condition as Example No. 10 in the embodiment.
Figure 17:
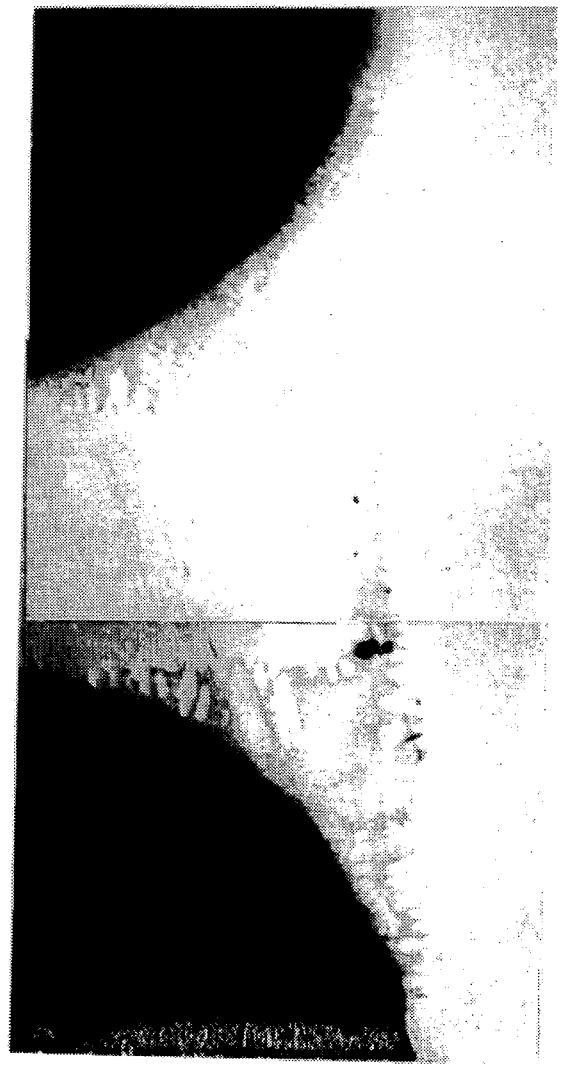
FIG. 17 is a photograph similarly showing the brazed portion corresponding to Example No. 11.
Figure 18:
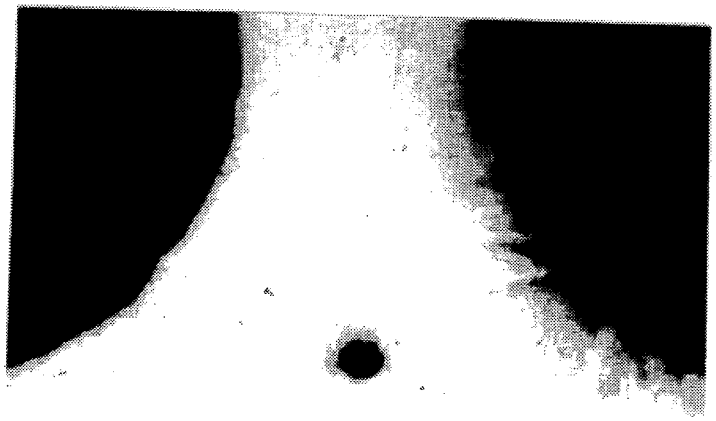
FIG. 18 is a photograph similarly showing the brazed portion corresponding to Example No. 12.
Figure 19:
FIG. 19 is a photograph similarly showing the brazed portion corresponding to Example No. 13.
Figure 20:
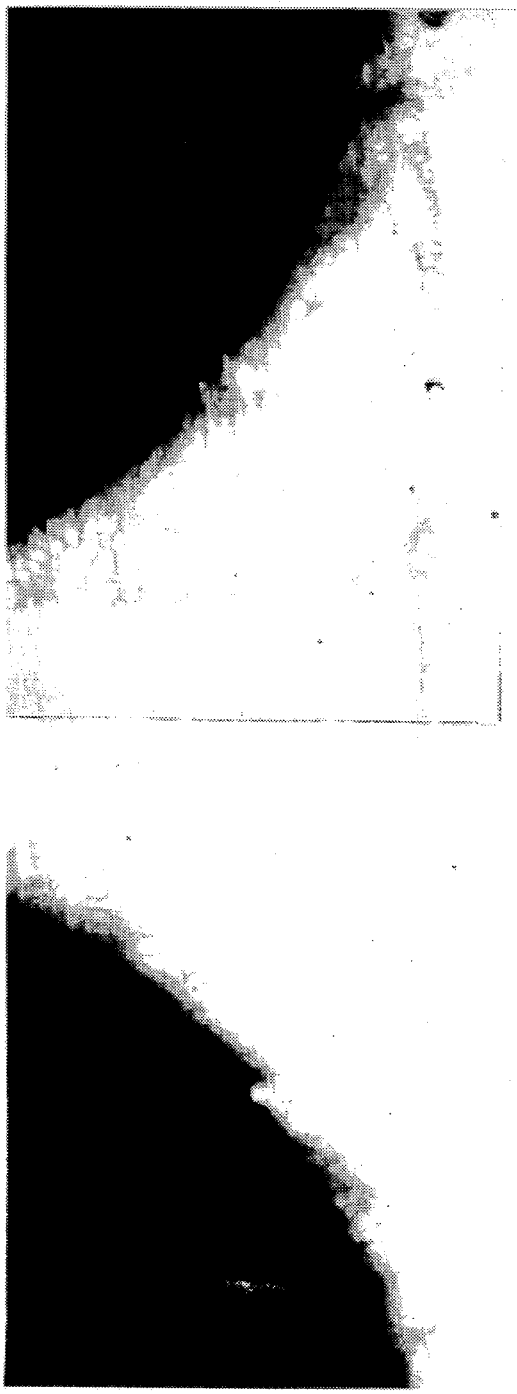
FIG. 20 also is a photograph similarly showing the brazed portion corresponding to Example No. 14.

As is clearly seen in the photographs of metallurgical textures, the powder particles 50 (shown in FIGS. 6B, 7B and 8B) were kept spherical in the brazing agent layers formed in accordance with the present invention. This means that only the surface of each particle was temporarily molten before solidified, but with the pith thereof kept unmolten. Further, Table 1 and the enlarged photographs of the brazed portions attest the formation of a sufficient fillet in each brazed portion of the material provided herein, and those fillets contribute to improve the brazing quality. In contrast, References have proved poorer in brazeability due to the brazing agent particles which completely melted to the core.

What is claimed is:

1. A brazeable aluminum material comprising:
   an aluminum core; and
   a brazing agent layer composed of a brazing agent thermally sprayed onto and covering a surface of the aluminum core;
   wherein a number of minute particles of the brazing agent are minute particles that have a solid core and a molten shell upon spraying impact with the aluminum core.

2. A brazeable aluminum material as defined in claim 1, wherein the brazing agent layer comprises an Al-Si alloy, and an average Si content in the layer is from about 5 to about 40% by weight.

3. A brazeable aluminum material as defined in claim 2, wherein the average Si content in the brazing agent layer is from about 8 to about 13% by weight.

4. A brazeable aluminum material as defined in claim 1, wherein the brazing agent layer comprises a mixture of Al and Si, and an average Si content in the layer is from about 5 to about 40% by weight.

5. A brazeable aluminum material as defined in claim 1, further comprising a Zn layer between the aluminum core and the brazing agent layer.

* * * * *